No. 897,808. PATENTED SEPT. 1, 1908.
F. WOLFENSBERGER.
DEVICE FOR THE SUPPORT OF WORK.
APPLICATION FILED MAR. 28, 1907.
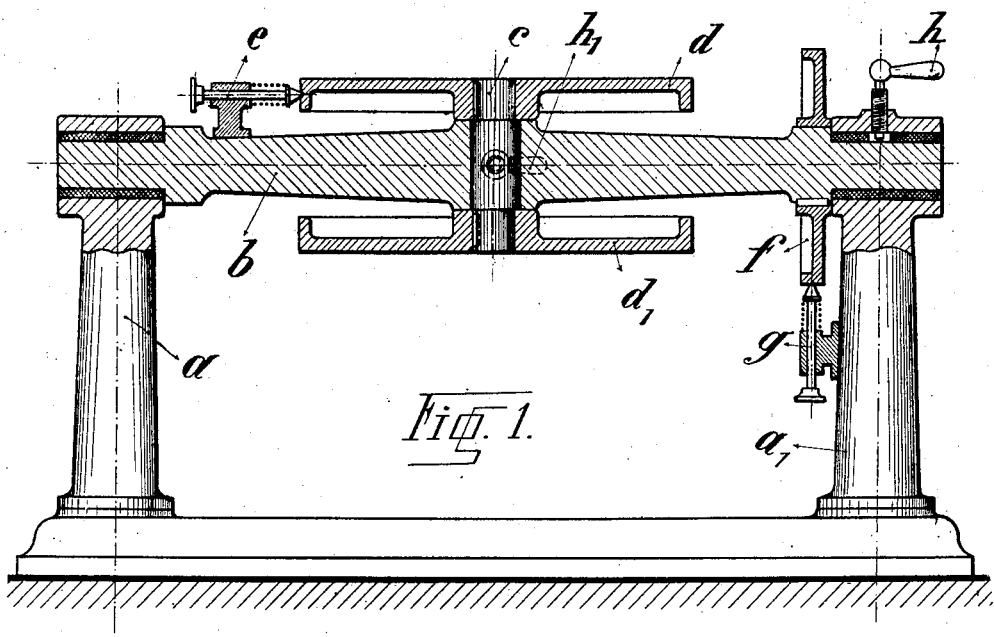
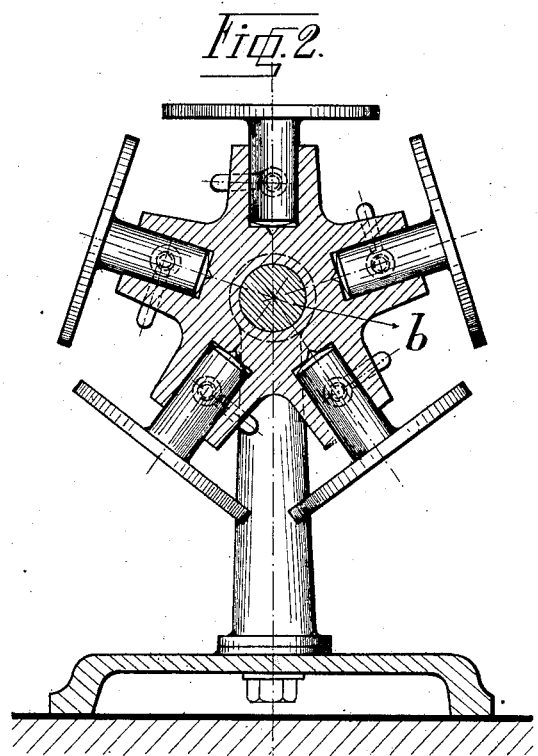
WITNESSES
INVENTOR:

UNITED STATES PATENT OFFICE.

FRITZ WOLFENSBERGER, OF MÜLHEIM-ON-THE-RHINE, GERMANY.

DEVICE FOR THE SUPPORT OF WORK.

No. 897,808.      Specification of Letters Patent.      Patented Sept. 1, 1908.

Application filed March 28, 1907. Serial No. 365,020.

*To all whom it may concern:*

Be it known that I, FRITZ WOLFENSBERGER, engineer, a citizen of Switzerland, residing at Mülheim-on-the-Rhine, Deutzerstrasse, Germany, have invented certain new and useful Improvements in Devices for the Support of Work; and I do hereby declare the following to be a full, clear, and exact description of the invention, such as will enable others skilled in the art to which it appertains to make and use the same.

This invention relates to a device for the support of work and has for its object to enable a piece of work to be fixed on a table and when so fixed to be adjusted so that various surfaces can be operated upon by different tools without the work having to be refixed on the table. It has previously been proposed to provide a table or plate to which work can be fixed this work being rotatable about an axis so that the different faces of the work can be presented to the same or different tools. Such arrangements however had limitations since it was not possible without refixing the work to operate on all the surfaces required but only those which were parallel to the axis of rotation.

According to this invention the table to which the work is fixed is so mounted that the work is rotatable in two planes at right angles to each other.

Two constructions of the device according to this invention are illustrated by way of example in the accompanying drawings in which, Figure 1 is a longitudinal section through such a device having two tables or plates on which work can be fixed. Fig. 2 is a cross section through a modified construction having five tables for carrying work.

In the construction illustrated in Fig. 1 the two vertical standards $a$ $a'$ carry bearings in which is rotatably mounted a horizontal member $b$ which may be in the form of a spindle. The latter is bored about its center at right angles to its axis to receive a spindle $c$ on the ends of which are keyed the tables $d$ $d'$. Each of these plates has indentations notches or like divisions with which can engage the spring controlled bolt $e$ so that the position of the table can be set by rotating it about its axis. A disk $f$ is mounted on the spindle $b$ and provided with notches, recesses or the like for the engagement of a spring bolt $g$ mounted on the standard $a'$. This enables the spindle to be set after rotation. After the spindle $b$ has been adjusted and the plate $d$ also set the spindle is fixed by the screw clamp $h$ and the table by the screw clamp $h'$.

In the modification illustrated in Fig. 2 a plurality of bearings are provided on the spindle or member $b$ and each table has a separate spindle which rests in the corresponding bearings. The circumference of each table may be provided if desired with divisions with which engages a spring catch. In either of these constructions the several pieces of work on the respective tables practically balance themselves about the main spindle since the tables are symmetrically distributed about this spindle.

This device makes it possible for example to bore, punch, fit and finish all surfaces of a piece of work without refixing it on the table. It also enables several pieces of work to be successively treated by the same tool without adjustment of the tool and thus time is economized.

The device is particularly adapted for use as a boring or drilling table where the operation to be performed on the work occupies a small amount of time compared to that ordinarily required for fixing the work in position.

The standards may be adjustable on the bed plate by mounting them on a frame or otherwise so that the device can be traversed beneath the tool this arrangement being useful in drilling machines.

Having now particularly described and ascertained the nature of my said invention, and in what manner the same is to be performed I declare that what I claim is:

1. A work holding device comprising a main rotatable member, a plurality of rotatable flat-faced tables mounted thereon adapted to support the work to present the various faces thereof to the operating tools, the axes of rotation of the main member and of the tables being located at substantially right angles to each other, and means for retaining the main member and each table at any desired position in their respective rotatory paths.

2. A work holding device comprising a rotatable spindle, means for setting and retaining said spindle at any point in its rotation, a plurality of flat rotatable tables mounted on said spindle adapted to support the work to present the various faces thereof to the operating tools, the axes of rotation of the spindle and of the tables being located at substantially right angles to each other, and means for setting and retaining the tables at any point in the rotation thereof.

3. A work holding device comprising a horizontal shaft rotatably mounted in a support, a plurality of flat-surfaced tables rotatably mounted on said shaft, the axes of rotation of said shaft and said tables being substantially at right angles to each other, and separate means for locking said tables to the shaft and the shaft to its support.

In testimony whereof I have affixed my signature, in presence of two witnesses.

FRITZ WOLFENSBERGER.

Witnesses:
    JOHANNES MARCH,
    LOUIS VANDORN.